(12) United States Patent
Shahar et al.

(10) Patent No.: US 11,822,973 B2
(45) Date of Patent: Nov. 21, 2023

(54) OPERATION FENCING SYSTEM

(71) Applicant: MELLANOX TECHNOLOGIES, LTD., Yokneam (IL)

(72) Inventors: Ariel Shahar, Jerusalem (IL); Ahmad Omary, Kfar Nein (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 504 days.

(21) Appl. No.: 16/571,220

(22) Filed: Sep. 16, 2019

(65) Prior Publication Data

US 2021/0081207 A1    Mar. 18, 2021

(51) Int. Cl.
   *G06F 9/46*   (2006.01)
   *G06F 9/52*   (2006.01)

(52) U.S. Cl.
   CPC .................................. *G06F 9/522* (2013.01)

(58) Field of Classification Search
   CPC ...................................................... G06F 9/522
   See application file for complete search history.

(56) References Cited

U.S. PATENT DOCUMENTS

| | | | |
|---|---|---|---|
| 5,339,449 A | 8/1994 | Karger et al. | |
| 5,802,394 A | 9/1998 | Baird et al. | |
| 6,718,370 B1 | 4/2004 | Coffman et al. | |
| 6,789,143 B2 | 9/2004 | Craddock et al. | |
| 7,013,419 B2 | 3/2006 | Kagan et al. | |
| 7,149,819 B2 | 12/2006 | Pettey | |
| 7,152,122 B2 | 12/2006 | Kagan et al. | |
| 7,912,988 B2 | 3/2011 | Boyd et al. | |
| 7,945,911 B1 | 5/2011 | Garthwaite | |
| 8,463,966 B2 | 6/2013 | Riocreux et al. | |
| 8,813,245 B1 | 8/2014 | Corley et al. | |
| 9,026,744 B2 | 5/2015 | Hofmann et al. | |
| 9,104,512 B2 | 8/2015 | BlockSome et al. | |
| 9,471,402 B1 * | 10/2016 | Bayareddy | G06F 9/542 |
| 10,051,038 B2 | 8/2018 | Makhervaks | |
| 10,558,581 B1 | 2/2020 | Lazier | |
| 10,698,767 B1 | 6/2020 | De Kadt et al. | |
| 11,416,294 B1 | 8/2022 | Davis | |
| 2005/0050188 A1 | 3/2005 | Davis et al. | |
| 2006/0184949 A1 | 8/2006 | Craddock et al. | |

(Continued)

OTHER PUBLICATIONS

Shahar et al., U.S. Appl. No. 16/571,122, filed Sep. 15, 2019.

(Continued)

*Primary Examiner* — Tammy E Lee
(74) *Attorney, Agent, or Firm* — KLIGLER & ASSOCIATES PATENT ATTORNEYS LTD

(57) ABSTRACT

A method including an executing entity, including fencing dependency circuitry, communicating with physical memory including a work queue (WQ) including a first controlling work request (WR), and a first dependent WR, the first dependent WR including a fencing indication indicating that the first dependent WR should not be executed until the first controlling WR has completed, the fencing dependency circuitry determining that the first dependent WR is ready for execution and checking, based on the fencing indication in the first dependent WR, whether the first controlling WR has completed, and the executing entity executing the first dependent WR only when the first controlling WR has completed. Related apparatus and methods are also provided.

9 Claims, 5 Drawing Sheets

WORK QUEUE

| IDENTIFIER | FENCE |
|---|---|
| WR1A | 0 |
| WR4 | 0 |
| 152  WR5 | 0  154 |
| WR6 | 0 |
| 156  WR1B | 1  158 |
| WR2A | 0 |
| WR2B | 1 |
| WR3A | 0 |
| WR3B | 1 |

100
110
115
120
125
130
135
140
145
150
105
155

(56) References Cited

U.S. PATENT DOCUMENTS

| | | |
|---|---|---|
| 2007/0088871 A1 | 4/2007 | Kwong et al. |
| 2007/0208820 A1 | 9/2007 | MakherVaks et al. |
| 2007/0256058 A1 | 11/2007 | Marfatia et al. |
| 2009/0168786 A1 | 7/2009 | Sarkar et al. |
| 2011/0055531 A1* | 3/2011 | Bellows .............. G06F 9/3857 712/245 |
| 2011/0082985 A1 | 4/2011 | Haines et al. |
| 2015/0143384 A1* | 5/2015 | Lojewski .............. G06F 9/544 718/107 |
| 2015/0379424 A1* | 12/2015 | Dirac .................. G06N 20/00 706/12 |
| 2016/0026604 A1 | 1/2016 | Pandit et al. |
| 2016/0246641 A1 | 8/2016 | Kogan et al. |
| 2016/0283415 A1* | 9/2016 | McBride .............. G06F 13/42 |
| 2018/0217754 A1* | 8/2018 | Lee .................... G06F 3/0685 |
| 2018/0349145 A1* | 12/2018 | Tye ..................... G06F 9/505 |
| 2018/0365053 A1 | 12/2018 | Burroughs et al. |
| 2019/0034381 A1 | 1/2019 | Burstein et al. |
| 2020/0073713 A1 | 3/2020 | Nield et al. |
| 2020/0257555 A1* | 8/2020 | Underwood .......... G06F 9/3877 |
| 2020/0301753 A1* | 9/2020 | Havlir .................. G06F 9/522 |
| 2020/0356419 A1* | 11/2020 | Jacob ................... G06F 9/546 |
| 2020/0401458 A1 | 12/2020 | Roy et al. |

OTHER PUBLICATIONS

Kuperstein et al., "Automatic Inference of Memory Fences", Published in Formal Methods in Computer Aided Design, pp. 1-9, Oct. 20-23, 2010.

Wikipedia, "Memory barrier", pp. 1-4, Apr. 5, 2019.

Howells et al., "Linux Kernel Memory Barriers", pp. 1-48, Jun. 19, 2019.

McKenney., "Memory Barriers: a Hardware View for Software Hackers", Linux Technology Center, pp. 1-28, Jul. 23, 2010.

EP Application # 20195810.5 Search Report dated Feb. 4, 2021.

U.S. Appl. No. 16/571,122 Office Action dated Apr. 2, 2021.

U.S. Appl. No. 17/331,657 Office Action dated Dec. 14, 2022.

U.S. Appl. No. 17/331,657 Office Action dated Apr. 10, 2023.

U.S. Appl. No. 17/331,657 Office Action dated Aug. 8, 2023.

* cited by examiner

WORK QUEUE — 100

| IDENTIFIER | FENCE | |
|---|---|---|
| WR1A | 0 | 110 |
| WR4 | 0 | 115 |
| _152_ WR5 | 0 _154_ | 120 |
| WR6 | 0 | 125 |
| _156_ WR1B | 1 _158_ | 130 |
| WR2A | 0 | 135 |
| WR2B | 1 | 140 |
| WR3A | 0 | 145 |
| WR3B | 1 | 150 |

*FIG. 1*

WORK QUEUE — 200

| IDENTIFIER | FENCE | DEPENDENCY | |
|---|---|---|---|
| WR1A | 0 | 0 | 210 |
| WR4 | 0 | 0 | 215 |
| WR5 | 0 | 0 | 220 |
| WR6 | 0 | 0 | 225 |
| _265_ WR1B | 1 _270_ | WR1A _275_ | 230 |
| WR2A | 0 | 0 | 235 |
| _280_ WR2B | 1 | WR2A _285_ | 240 |
| WR3A | 0 | 0 | 245 |
| _290_ WR3B | 1 | WR3A _295_ | 250 |

*FIG. 2*

OPERATION FENCING SYSTEM

FIELD OF THE INVENTION

The present invention relates in general to operation fencing.

BACKGROUND OF THE INVENTION

Operation fencing, which is also known as using operation barriers, is a technique for enforcing ordering constraints on operations. Operation fencing is particularly, but not necessarily exclusively, useful in shared memory systems, such as, by way of non-limiting example, shared memory multiprocessor systems, and systems in which memory is shared between a processor and a peripheral. Operation fencing is also, by way of non-limiting example, useful in a network system, in which a plurality of network operations take place, and the initiator of the network operations requires that at least some of the network operations be strongly ordered.

SUMMARY OF THE INVENTION

The present invention, in certain exemplary embodiments thereof, seeks to provide an improved system and method for operation fencing.

There is thus provided in accordance with an exemplary embodiment of the present invention a method including an executing entity, including fencing dependency circuitry, communicating with physical memory including a work queue (WQ) including a first controlling work request (WR), and a first dependent WR, the first dependent WR including a fencing indication indicating that the first dependent WR should not be executed until the first controlling WR has completed, the fencing dependency circuitry determining that the first dependent WR is ready for execution and checking, based on the fencing indication in the first dependent WR, whether the first controlling WR has completed, and the executing entity executing the first dependent WR only when the first controlling WR has completed.

Further in accordance with an exemplary embodiment of the present invention the physical memory is situated external to the executing entity.

Still further in accordance with an exemplary embodiment of the present invention the physical memory is included in a physical computing device external to the executing entity, the physical computing device also including a processor, the processor being operative to access the WQ.

Additionally in accordance with an exemplary embodiment of the present invention the fencing indication in the first dependent WR includes an identifier of the first controlling WR, and the checking whether the first controlling WR has completed includes the fencing dependency circuitry determining whether the first controlling WR has completed based on the identifier of the first controlling WR.

Moreover in accordance with an exemplary embodiment of the present invention the fencing dependency circuitry determining whether the first controlling WR has completed based on the identifier of the first controlling WR includes the executing entity checking a completion queue (CQ) in the physical memory to determine whether the CQ includes an entry indicating that the first controlling WR has completed.

Further in accordance with an exemplary embodiment of the present invention the WQ also includes a second controlling WR, and a second dependent WR, the second dependent WR including a fencing indication indicating that the second dependent WR should not be executed until the second controlling WR has completed, and the method also includes the fencing dependency circuitry determining that the second dependent WR is ready for execution and checking, based on the fencing indication in the second dependent WR, whether the second controlling WR has completed, and the executing entity executing the second dependent WR only when the second controlling WR has completed.

Still further in accordance with an exemplary embodiment of the present invention the fencing indication in the second dependent WR includes an identifier of the second controlling WR, and the checking whether the second controlling WR has completed includes the fencing dependency circuitry determining whether the second controlling WR has completed based on the identifier of the second controlling WR.

Additionally in accordance with an exemplary embodiment of the present invention the executing entity determining whether the second controlling WR has completed based on the identifier of the second controlling WR includes the executing entity checking a completion queue (CQ) in the physical memory to determine whether the CQ includes an entry indicating that the second controlling WR has completed.

Moreover in accordance with an exemplary embodiment of the present invention the WQ includes a plurality of WRs, the plurality of WRs including the first dependent WR, the first controlling WR, and at least one other WR, each WR of the plurality of WRs having a position in the WQ and an identifier corresponding to the position, and each WR of the plurality of WRs is completed in order, in accordance with the position of each WR of the plurality of WRs in the WQ and with the identifier, and the fencing dependency circuit checks whether the first controlling WR has completed based on the identifier of the first controlling WR and on an identifier of a most recently completed WR.

There is also provided in accordance with another exemplary embodiment of the present invention apparatus including an executing entity communicating with physical memory including a work queue (WQ) including a first controlling work request (WR), and a first dependent WR, the first dependent WR including a fencing indication indicating that the first dependent WR should not be executed until the first controlling WR has completed, and fencing dependency circuitry in communication with the executing entity and configured to determine that the first dependent WR is ready for execution and to check, based on the fencing indication in the first dependent WR, whether the first controlling WR has completed, wherein the executing entity is configured to execute the first dependent WR only when the first controlling WR has completed.

Further in accordance with an exemplary embodiment of the present invention the fencing dependency circuitry is included in the executing entity.

Still further in accordance with an exemplary embodiment of the present invention the physical memory is situated external to the executing entity.

Additionally in accordance with an exemplary embodiment of the present invention the physical memory is included in a physical computing device external to the executing entity, the physical computing device also including a processor, the processor being operative to access the WQ.

Moreover in accordance with an exemplary embodiment of the present invention the fencing indication in the first dependent WR includes an identifier of the first controlling WR, and the fencing dependency circuitry is configured to check whether the first controlling WR has completed based on the identifier of the first controlling WR.

Further in accordance with an exemplary embodiment of the present invention the fencing dependency circuitry is configured to determine whether the first controlling WR has completed based on the identifier of the first controlling WR based on the executing entity checking a completion queue (CQ) in the physical memory to determine whether the CQ includes an entry indicating that the first controlling WR has completed.

Still further in accordance with an exemplary embodiment of the present invention the WQ also includes a second controlling WR, and a second dependent WR, the second dependent WR including a fencing indication indicating that the second dependent WR should not be executed until the second controlling WR has completed, and the fencing dependency circuitry is configured to determine that the second dependent WR is ready for execution and to check, based on the fencing indication in the second dependent WR, whether the second controlling WR has completed, and the executing entity is configured to execute the second dependent WR only when the second controlling WR has completed.

Additionally in accordance with an exemplary embodiment of the present invention the fencing indication in the second dependent WR includes an identifier of the second controlling WR, and the fencing dependency circuitry checking whether the second controlling WR has completed includes the fencing dependency circuitry determining whether the second controlling WR has completed based on the identifier of the second controlling WR.

Moreover in accordance with an exemplary embodiment of the present invention the executing entity determining whether the second controlling WR has completed based on the identifier of the second controlling WR includes the executing entity checking a completion queue (CQ) in the physical memory to determine whether the CQ includes an entry indicating that the second controlling WR has completed.

Further in accordance with an exemplary embodiment of the present invention the WQ includes a plurality of WRs, the plurality of WRs including the first dependent WR, the first controlling WR, and at least one other WR, each WR of the plurality of WRs having a position in the WQ and an identifier corresponding to the position, and each WR of the plurality of WRs is completed in order, in accordance with the position of each WR of the plurality of WRs in the WQ and with the identifier, and the fencing dependency circuit is configured to check whether the first controlling WR has completed based on the identifier of the first controlling WR and on an identifier of a most recently completed WR.

BRIEF DESCRIPTION OF THE DRAWINGS

The present invention will be understood and appreciated more fully from the following detailed description, taken in conjunction with the drawings in which:

FIGS. 1-4 are simplified partly pictorial, partly block-diagram illustrations of a system for operation fencing, constructed and operative in accordance with exemplary embodiments of the present invention;

DETAILED DESCRIPTION OF AN EMBODIMENT

Figure 3:
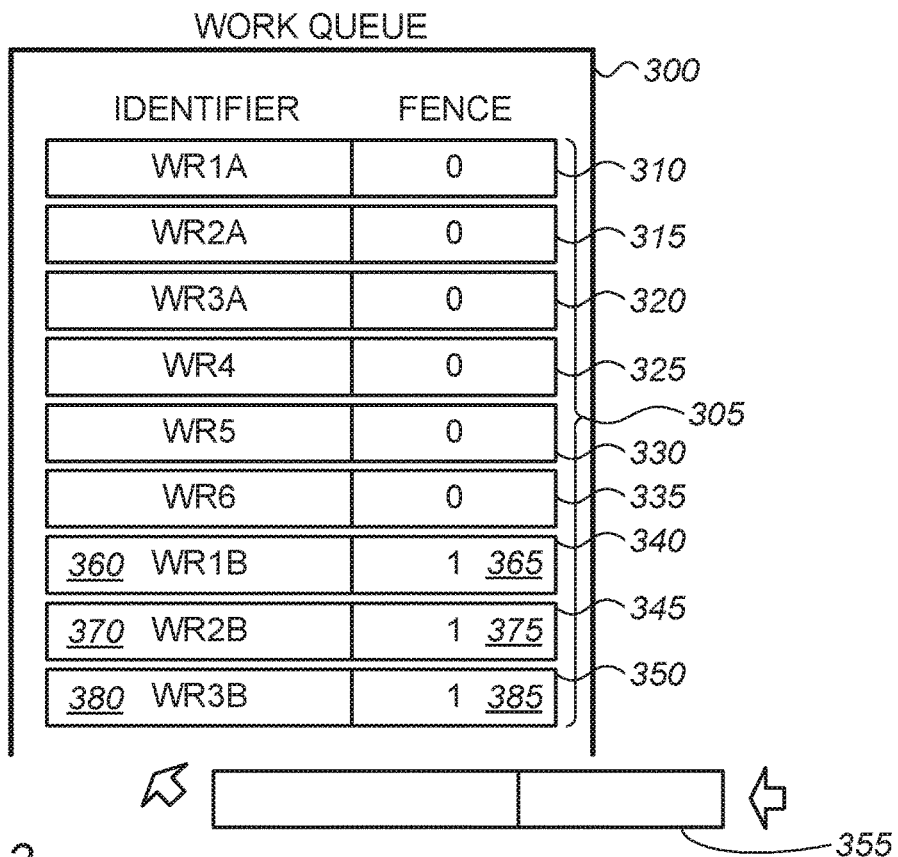

By way of introduction, it is known in certain systems that a Work Queue (WQ) is a structure that is used for interfacing between two entities. For example, and without limiting the generality of the foregoing, a WQ is one method by which an entity (which may be, by way of non-limiting example, a software entity), sometimes known as a requesting entity, running on a host processor (also termed a "host CPU" or a "CPU") may request service from a hardware entity, sometimes known as an executing entity. Such an executing entity may comprise, by way of non-limiting example, a networking device, or may be comprised in a networking device (by way of further specific non-limiting example, the executing entity may comprise an integrated circuit (IC) in a networking device). By way of further non-limiting example, such a networking device may comprise a network interface controller (NIC). The requesting entity generally pushes work requests (WRs) to the WQ; the requesting entity is also sometimes called a producer of the WR. The WRs are executed by the executing entity, sometimes called a consumer of the WR.

To send and receive communications over a network, a client initiates work requests (WRs), which causes work items, called work queue elements (WQEs), to be placed onto the appropriate queues. The NIC then executes the work items, so as to communicate with a corresponding NIC.

For the consumer to signal to the producer that a WR has been completed, a completion queue (CQ) may be used. Completion queue entries (CQEs) are pushed to the CQ by the consumer. Each CQE signals completion of execution of one or more WRs that were posted to the work queue, the WRs having been processed and completed.

A system of the type discussed above is described in U.S. Pat. No. 7,152,122 to Kagan et al, the disclosure of which is hereby incorporated herein by reference.

An operation barrier, also known as an operation fence or fence instruction, is a type of barrier instruction that causes a processor such as, by way of non-limiting example, a central processing unit (CPU), to enforce an ordering constraint on operations issued prior to and after the barrier instruction; this typically means that operations issued prior to the barrier are guaranteed to be performed before operations issued after the barrier.

Reference is now made to FIGS. 1-4, which are simplified partly pictorial, partly block-diagram illustrations of a system for operation fencing, constructed and operative in accordance with exemplary embodiments of the present invention.

Each of FIGS. 1-4 illustrates a work queue (WQ). In each case, the WQ would be situated in a physical memory of a physical computing device (not explicitly shown in FIGS. 1-4, but shown in FIGS. 5 and 6).

Referring specifically to FIG. 1, FIG. 1 illustrates a WQ 100, comprising a plurality of work requests (WRs) 105. For simplicity of depiction and description, a relatively small number of WRs are shown and described in FIG. 1, it being appreciated that a smaller or larger number of WRs may actually be comprised in the WQ 100. Generally, each of the WRs shown in the WQ 100 has an identifier value and a fence indicator. The fence indicator indicates whether or not the particular WR is fenced; that is, whether or not execution of the particular WR is to wait until previous WRs have been executed. In the particular example of FIG. 1, a fenced WR is not executed until all previous WRs have been executed. Without limiting the generality of the exemplary embodiment of FIG. 1, in the depiction of FIG. 1, a fence indicator of "1" indicates that a particular WR is fenced, while a fence indicator of "0" indicates that a particular WR is not fenced; it is appreciated, however, that the values of "0" and "1" are arbitrary, and that other values may be used in an actual system.

Specifically, the following WRs are depicted in FIG. 1, by way of particular non-limiting example:

WR 110, having identifier value WR1A and fence value 0;

WR 115, having identifier value WR4 and fence value 0;

WR 120, whose identifier 152 has identifier value WR5 and whose fence indicator 154 has fence value 0;

WR 125, having identifier value WR6 and fence value 0;

WR 130, whose identifier 156 has identifier value WR1B and whose fence indicator 158 has fence value 1;

WR 135, having identifier value WR2A and fence value 0;

WR 140, having identifier value WR2B and fence value 1;

WR 145, having identifier value WR3A and fence value 0; and

WR 150, having identifier value WR3B and fence value 1

Also shown in FIG. 1 is WR 155, depicted as entering the WQ 100, as a general indication that further WRs may enter the WQ 100. For simplicity of description, it is assumed throughout the description of FIG. 1 that the WRs entered the WQ 100 in the order indicated (from WR 110 through WR 150), but this example is non-limiting.

Referring specifically to FIG. 2, FIG. 2 illustrates a WQ 200, comprising a plurality of work requests (WRs) 205. For simplicity of depiction and description, a relatively small number of WRs are shown and described in FIG. 2, it being appreciated that a smaller or larger number of WRs may actually be comprised in the WQ 200. Generally, each of the WRs shown in the WQ 200 has an identifier value, a fence indicator, and a dependency indicator. The fence indicator indicates whether or not the particular WR is fenced; that is, whether or not execution of the particular WR is to wait until a specific previous WR been executed. Without limiting the generality of the exemplary embodiment of FIG. 2, in the depiction of FIG. 2, a fence indicator of "1" indicates that a particular WR is fenced, while a fence indicator of "0" indicates that a particular WR is not fenced; it is appreciated, however, that the values of "0" and "1" are arbitrary, and that other values may be used in an actual system. The dependency indicator indicates, for a given WR, the identifier of another WR to which the given WR is fenced. It is appreciated that, in alternative exemplary embodiments, the fence indicator might be omitted, since (by way of non-limiting example) a non-zero dependency indicator could indicate that the given WR is fenced, while a zero dependency indicator (or some other value, such as −1, which value could indicate that there is no dependency for the given WR) could indicate that the given WR is not fenced.

Specifically, the following WRs are depicted in FIG. 2, by way of particular non-limiting example:

WR 210, having identifier value WR1A, fence value 0, and dependency value 0;

WR 215, having identifier value WR4, fence value 0, and dependency value 0.

WR 220, having identifier value WR5, fence value 0, and dependency value 0;

WR 225, having identifier value WR6, fence value 0, and dependency value 0;

WR 230, whose identifier 265 has an identifier value WR1B, whose fence indicator 270 has a fence value 1, and whose dependency indicator 275 has a dependency value WR1A;

WR 235, having identifier value WR2A, fence value 0, and dependency value 0;

WR 240, whose identifier 280 has an identifier value WR2B, which has a fence value 1, and whose dependency indicator 285 has a dependency value WR2A;

WR 245, having identifier value WR3A, fence value 0, and dependency value 0; and WR 250, whose identifier 290 has an identifier value WR3B, which has a fence value 1, and whose dependence indicator 295 has a dependency value WR3A.

Also shown in FIG. 2 is WR 255, depicted as entering the WQ 200, as a general indication that further WRs may enter the WQ 200. For simplicity of description, it is assumed throughout the description of FIG. 2 that the WRs entered the WQ 200 in the order indicated (from WR 210 through WR 250), but this example is non-limiting.

Referring specifically to FIG. 3, FIG. 3 illustrates a WQ 300, comprising a plurality of work requests (WRs) 305. For simplicity of depiction and description, a relatively small number of WRs are shown and described in FIG. 3, it being appreciated that a smaller or larger number of WRs may actually be comprised in the WQ 300. Generally, each of the WRs shown in the WQ 300 has an identifier value and a fence indicator. The fence indicator indicates whether or not the particular WR is fenced; that is, whether or not execution of the particular WR is to wait until a specific previous WR has been executed. Without limiting the generality of the exemplary embodiment of FIG. 3, in the depiction of FIG. 3, a fence indicator of "1" indicates that a particular WR is fenced, while a fence indicator of "0" indicates that a particular WR is not fenced; it is appreciated, however, that the values of "0" and "1" are arbitrary, and that other values may be used in an actual system.

Specifically, the following WRs are depicted in FIG. 3, by way of particular non-limiting example:

WR 310, having identifier value WR1A and fence value 0.

WR 315, having identifier value WR2A and fence value 0;

WR 320, having identifier value WR3A and fence value 0.

WR 325, having identifier value WR4 and fence value 0;

WR 330, having identifier value WR5 and fence value 0;

WR 335, having identifier value WR6 and fence value 0;

WR 340, whose identifier field 360 has identifier value WR1B, and whose fence field 365 has fence value 1;

WR 345, whose identifier field 370 has identifier value WR2B, and whose fence field 375 has fence value 1; and WR 350, whose identifier field 380 has identifier value WR3B and whose fence field 385 has fence value 1.

Also shown in FIG. 3 is WR 355, depicted as entering the WQ 300, as a general indication that further WRs may enter the WQ 300. For simplicity of description, it is assumed throughout the description of FIG. 3 that the WRs entered the WQ 300 in the order indicated (from WR 310 through WR 350), but this example is non-limiting.

Figure 4:
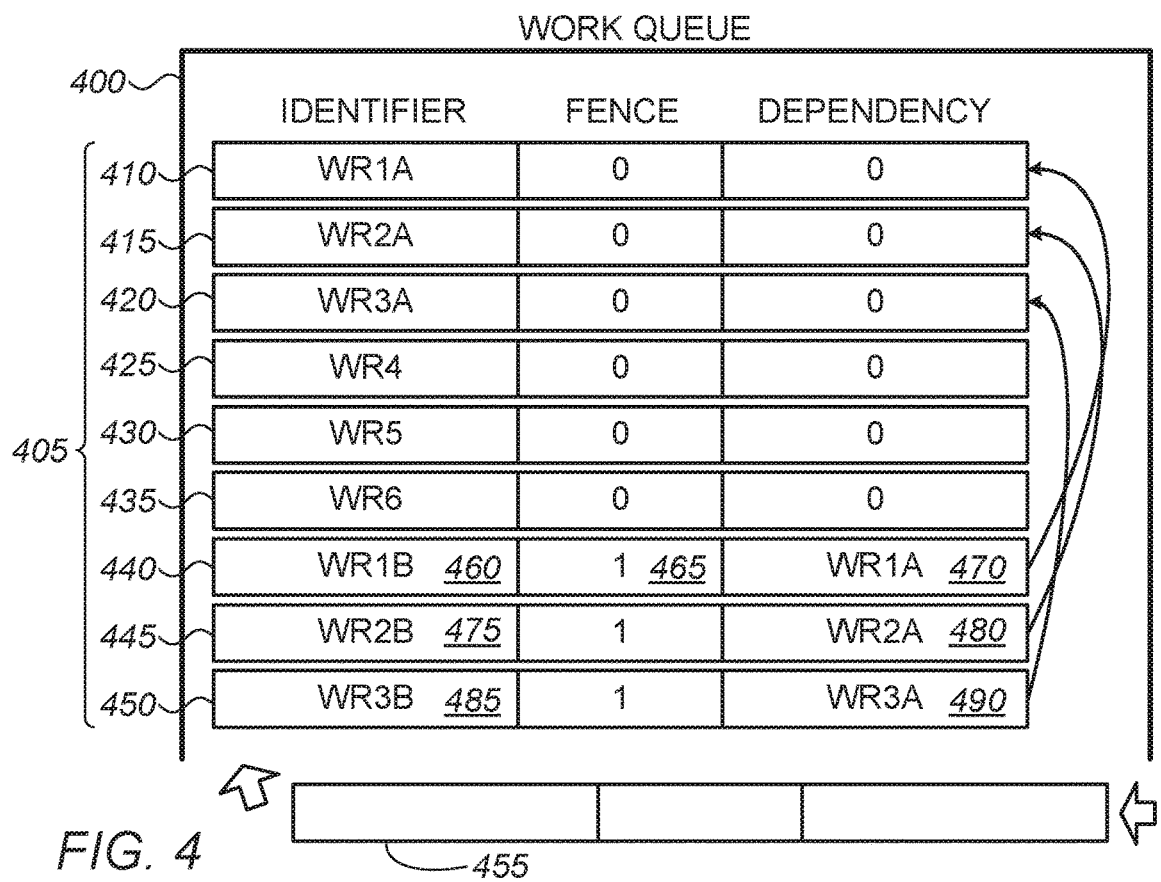

Referring specifically to FIG. 4, FIG. 4 illustrates a WQ 400, comprising a plurality of work requests (WRs) 405. For simplicity of depiction and description, a relatively small number of WRs are shown and described in FIG. 4, it being appreciated that a smaller or larger number of WRs may actually be comprised in the WQ 400. Generally, each of the WRs shown in the WQ 400 has an identifier value, a fence indicator, and a dependency indicator. The fence indicator indicates whether or not the particular WR is fenced; that is, whether or not execution of the particular WR is to wait until previous WRs have been executed. Without limiting the generality of the exemplary embodiment of FIG. 4, in the depiction of FIG. 4, a fence indicator of "1" indicates that a particular WR is fenced, while a fence indicator of "0" indicates that a particular WR is not fenced; it is appreciated, however, that the values of "0" and "1" are arbitrary, and that other values may be used in an actual system. The dependency indicator indicates, for a given WR, the identifier of another WR to which the given WR is fenced. It is appreciated that, in alternative exemplary embodiments, the fence indicator might be omitted, since (by way of non-limiting example) a non-zero dependency indicator could indicate that the given WR is fenced, while a zero dependency indicator (or some other value, such as −1, which value could indicate that there is no dependency for the given WR) could indicate that the given WR is not fenced.

Specifically, the following WRs are depicted in FIG. 4, by way of particular non-limiting example:

WR 410, having identifier value WR1A, fence value 0, and dependency value 0;

WR 415, having identifier value WR2A, fence value 0, and dependency value 0;

WR 420, having identifier value WR3A, fence value 0, and dependency value 0;

WR 425, having identifier value WR4, fence value 0, and dependency value 0;

WR 430, having identifier WR5, fence value 0, and dependency value 0;

WR 435, having identifier value WR6, fence value 0, and dependency value 0;

WR 440, whose identifier 460 has an identifier value WR1B, whose fence field 465 has a fence value 1, and whose dependence indicator 470 has a dependency value WR1A;

WR 445, whose identifier 475 has an identifier value WR2B, has a fence value 0, and whose dependence indicator 480 has dependency value WR2A; and WR 450, whose identifier 485 has an identifier value WR3B, which has a fence value 1, and whose dependence indicator 490 has a dependency value WR3A.

Also shown in FIG. 4 is WR 455, depicted as entering the WQ 400, as a general indication that further WRs may enter the WQ 400. For simplicity of description, it is assumed throughout the description of FIG. 4 that the WRs entered the WQ 400 in the order indicated (from WR 410 through WR 450), but this example is non-limiting.

Generally, FIGS. 1 and 3 depict systems with operation barriers (fences) which are general, not dependent on particular previous operations. Thus, for example, in FIG. 1, WR 120, whose identifier 152 has identifier value WR5 and whose fence indicator 154 has fence value 0, is not a fenced work request, such that the operation indicated by WR5 can take place without waiting for any previous operations to complete. By contrast, WR 130, whose identifier 156 has identifier value WR1B and whose fence indicator 158 has fence value 1, is a fenced work request, such that the operation indicated by WR1B must wait for all previous operations to complete. The choice of identifier values in FIG. 1 is meant to suggest that WR 130 is conceptually dependent on WR 110 (identifier values WR1B and WR1A respectively), but given that the barriers (fences) in FIG. 1A are general, not dependent on previous operations, a system incorporating WQ 100 will need to wait ("stall") until all previous WRs have completed before executing WR 130, because WR 130 is fenced. It will be appreciated that, mutatis mutandis, a similar situation exists in FIG. 3.

Figure 6:
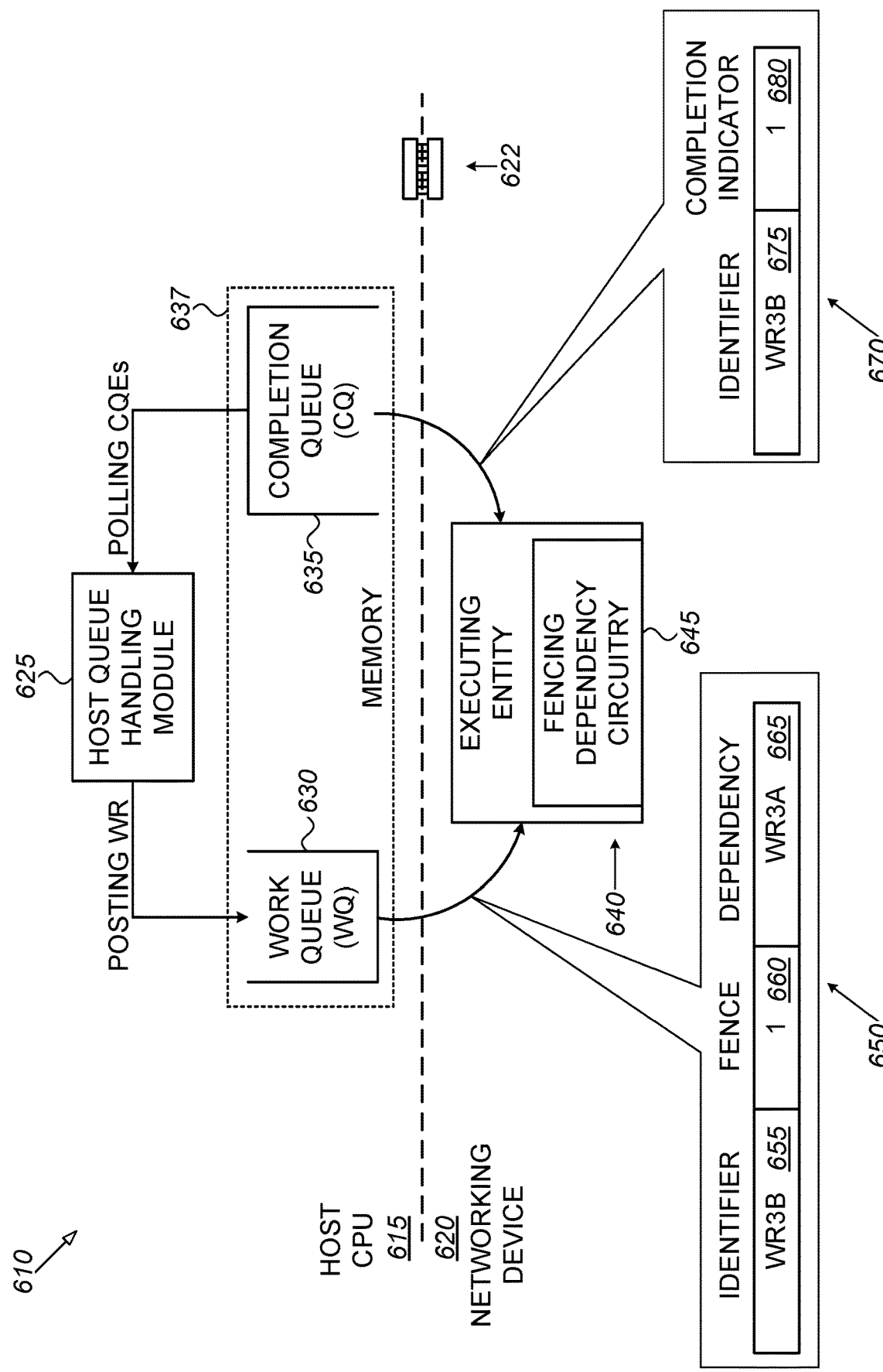
FIG. 6 is a simplified partly pictorial, partly block-diagram illustration of another system for operation fencing, constructed and operative in accordance with another exemplary embodiment of the present invention.

Generally, FIGS. 2 and 4 depict systems with operation barriers (fences) which are dependent on particular previous operations. Thus, for example, in FIG. 2, WR 230, whose identifier 265 has identifier value WR1B, whose fence indicator 270 has fence value 1, and whose dependence indicator 275 has a dependency value WR1A, is a fenced work request which is explicitly dependent on the completion of a particular previous work request having an identifier WR1A (WR 210). In operation, WR 230 may not execute or take place until WR 210 has completed. The structure of WR 200, in practice and as described below with reference to FIG. 6, is intended to significantly improve system operations by reducing or eliminating "stalls". It will be appreciated that, mutatis mutandis, a similar situation exists in FIG. 4.

Persons skilled in the art will thus appreciate that the systems of FIGS. 2 and 4 may provide significantly increased efficiencies to computerized systems in which the systems of FIGS. 2 and 4 are incorporated, relative to the systems of FIGS. 1 and 3. This is because, in the systems of FIGS. 2 and 4, when a fenced work request (such as, by way of non-limiting example, WR 230 of FIG. 2) is to be executed, it needs to wait until the WR on which it is dependent (by way of non-limiting example, WR 210) has completed; continuing the particular non-limiting example, WR 230 generally need not wait for any other work request other than WR210 to complete; the problem of system stalling is thus reduced. Particular non-limiting exemplary mechanisms for causing a WR to wait until completion of another WR on which the first WR is dependent are depicted in FIGS. 5 and 6 and described below.

In the particular non-limiting example shown in FIG. 4, the advantage just explained may be particularly clear; this is because, by way of non-limiting example, the number of work requests in WQ 400 between WR 440 and WR 410, on which WR 440 is dependent, is relatively large, so that it may well be that WR 410 has already completed by the time that WR 440 is to be executed, so that no wait at all is necessary; this is in contrast to a situation in which all prior WRs must complete.

Figure 5:
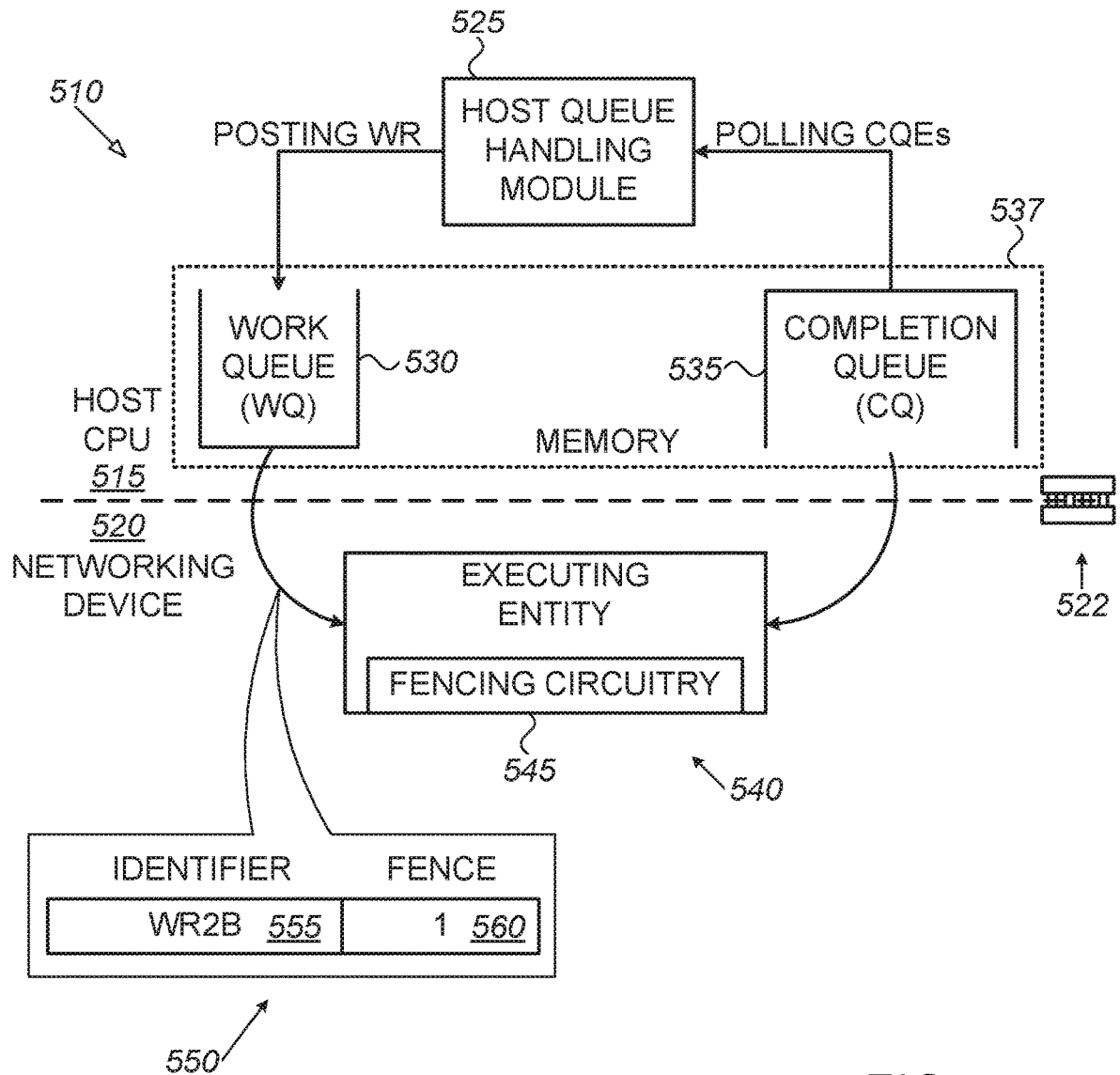
FIG. 5 is a simplified partly pictorial, partly block-diagram illustration of a system for operation fencing, constructed and operative in accordance with an exemplary embodiment of the present invention.

Reference is now made to FIG. 5, which is a simplified partly pictorial, partly block-diagram illustration of a system for operation fencing constructed and operative in accordance with an exemplary embodiment of the present invention. By way of non-limiting example, the system of FIG. 5 may be useful in conjunction with the system of FIG. 1 or the system of FIG. 3.

The exemplary system of FIG. 5, generally referenced 510, is shown as comprising a host CPU 515 and a networking device 520, which may be a NIC or other appropriate device, as described above. The host CPU 515 and the networking device 520 are depicted as connected by a bus 522. It is appreciated that a subcombination of the exemplary system of FIG. 5, not including the host 515, may comprise an alternative exemplary embodiment of the present invention. It is appreciated however that, in a case where the host CPU 515 is not part of an exemplary embodiment of the present invention, the networking device 520 may typically be in communication with the host 515 CPU external thereto via any appropriate connection (such as, by way of non-limiting example, via the bus 522).

The host CPU 515 is depicted as comprising a host queue handling module 525, which is configured to manage a work queue (WQ) 530 and a completion queue (CQ) 535, as generally described above. The WQ 530 holds work requests (WRs), as generally described above, while the CQ 535 hold CQEs, as generally described above. The WQ 530 and the CQ 535 are disposed in memory 537 disposed in or associated with the host CPU 515.

The networking device 520 is depicted as comprising an executing entity 540 (such as, by way of non-limiting example, an appropriate integrated circuit (IC)), which comprises fencing circuitry 545. (Alternatively, the fencing circuitry 545 may be external to the executing entity 540 and in communication therewith). The fencing circuitry 545 may comprise any appropriate circuitry configured to carry out the operations described herein; for reasons of efficiency of operation, the fencing circuitry 545 may, by way of non-limiting example, be comprised in hardware. The hardware, by way of further non-limiting example, may be designed in an automated or semi-automated process, as is known in the art, based on a formal description of the operations described herein as being carried out by the fencing circuitry 545. In certain exemplary embodiments, the fencing circuitry 545 may be configured to either enable or disable the executing entity 540, enabling or disabling processing of WRs (by way of non-limiting example, as described below) by the executing entity 540.

An exemplary mode of operation of the exemplary system of FIG. 5 is now briefly described.

As WRs, such as a WR 550, are popped for execution by the executing entity 540 from the WQ 530, the WRs are examined to see if the particular WR has a fencing indicator indicating that the particular WR is fenced. Specifically, depicted in FIG. 5 is a WR 550 having an identifier 555 with a value of WR2B (indicating what work is to be executed by the executing entity), and a fence field 560 having a fence value of 1; the fence value of 1 indicates (as described above) that the WR 550 is fenced. Thus, the fencing circuitry 545, in examining WRs arriving at the executing entity 540, will examine the fence field 560 and, since the fence field 560 indicates that the WR 550 is fenced, the fencing circuitry 545 will not allow execution of the work indicated by the identifier 555 until all WRs received at the executing entity 540 prior to the WR 550 have completed. The determination that such prior WRs have completed may take place, by way of non-limiting example, by examining CQEs in the CQ 535, although it is appreciated that such determination may take place in another manner (such as, by way of non-limiting example, by maintaining information regarding completed WRs locally in the executing entity 540 or elsewhere in the networking device 520).

Reference is now made to FIG. 6, which is a simplified partly pictorial, partly block-diagram illustration of a system for operation fencing constructed and operative in accordance with an exemplary embodiment of the present invention. By way of non-limiting example, the system of FIG. 6 may be useful in conjunction with the system of FIG. 2 or the system of FIG. 4.

The exemplary system of FIG. 6, generally referenced 610, is shown as comprising a host CPU 615 and a networking device 620, which may be a NIC or other appropriate device, as described above. The host CPU 615 and the networking device 620 are depicted as connected by a bus 622. It is appreciated that a subcombination of the exemplary system of FIG. 6, not including the host 615, may comprise an alternative exemplary embodiment of the present invention. It is appreciated however that, in a case where the host CPU 615 is not part of an exemplary embodiment of the present invention, the networking device 620 may typically be in communication with the host CPU 615 external thereto via any appropriate connection (such as, by way of non-limiting example, via the bus 622).

The host CPU 615 is depicted as comprising a host queue handling module 625, which is configured to manage a work queue (WQ) 630 and a completion queue (CQ) 635, as generally described above. The WQ 630 holds work requests (WRs), as generally described above, while the CQ 635 hold CQEs, as generally described above. The WQ 630 and the CQ 635 are disposed in memory (not explicitly shown) associated with the host CPU 615.

The networking device 620 is depicted as comprising an executing entity 640 (such as, by way of non-limiting example, an appropriate integrated circuit (IC)), which comprises fencing dependency circuitry 645. (Alternatively, the fencing dependency circuitry may be external to the executing entity 640 and in communication therewith). The fencing dependency circuitry 645 may comprise any appropriate circuitry configured to carry out the operations described herein; for reasons of efficiency of operation, the fencing dependency circuitry 645 may, by way of non-limiting example, be comprised in hardware. The hardware, by way of further non-limiting example, may be designed in an automated or semi-automated process, as is known in the art, based on a formal description of the operations described herein as being carried out by the fencing dependency circuitry 645.

An exemplary mode of operation of the exemplary system of FIG. 6 is now briefly described.

As WRs, such as a WR 650, are popped for execution by the executing entity 640 from the WQ 630, the WRs are examined to see if the particular WR has a fencing indicator indicating that the particular WR is fenced, and (if fenced) to what other WR the particular WR is fenced (variations on how such dependency might be indicated are described above). Specifically, depicted in FIG. 6 is a WR 650 having an identifier 655 with a value of WR3B (indicating what work is to be executed by the executing entity); a fence field 660 having a fence value of 1, the fence value of 1 indicating (as described above) that the WR 650 is fenced; and a dependency filed 655 having a dependency value of WR3A, indicating that the WR 650 is fenced to another WR having an identifier value of WR3A, such that WR 650 should not be executed until the WR having an identifier value of WR3A has completed. WRs such as the WR 650 are also termed herein "dependent WRs" (in various grammatical forms), while WRs such as the WR having an identifier value of WR3A are also termed herein "controlling WRs" (in various grammatical forms).

The fencing dependency circuitry 645, in examining WRs arriving at the executing entity 640, will examine the fence field 660 and, since the fence field 660 indicates that the WR 650 is fenced, the fencing dependency circuitry 645 will also examine the dependency field 665 and will not allow execution of the work indicated by the identifier 655 until the specific previous WR having an identifier value of WR3A has completed. The determination that such specific prior WR has completed may take place, by way of non-limiting example, by examining CQEs in the CQ 635, although it is appreciated that such determination may take place in another manner (such as, by way of non-limiting example, by maintaining information regarding completed WRs locally in the executing entity 640 or elsewhere in the networking device 620).

The following discussion refers to the exemplary system of FIG. 6 by way of non-limiting example, and for sake of simplicity of description; it is appreciated that similar considerations may apply, for example, to the exemplary system of FIG. 5, mutatis mutandis. In certain exemplary embodiments each identifier 655 may be an integer, with WRs in the WQ 630 being assigned, for example, identifier values which are ascending consecutive integers, in the order of entry of each WR into the WQ 630, in the identifier 655. In a particular case in which each WR is completed in order (after all WRs with a smaller identifier 655, and before any identifier with a larger identifier 655), it is sufficient to determine the value of the identifier 655 of the last completed WR in order to determine whether a fenced WR such as the fenced WR 650 may be executed, since comparison of the dependency field 665 in the fenced WR with the value of the identifier of the last completed WR indicates whether or not the fenced WR may be executed. That is, if the identifier 655 of the last completed WR is greater than or equal to the value of the dependency field 665 in the fenced WR, the fenced WR may be executed. In some exemplary embodiments, in which CQE entries are generated in order even in cases where WRs are completed out of order, information regarding a last WR which generated a last CQE entry may be used alternatively to information regarding a last WR.

Figure 7:
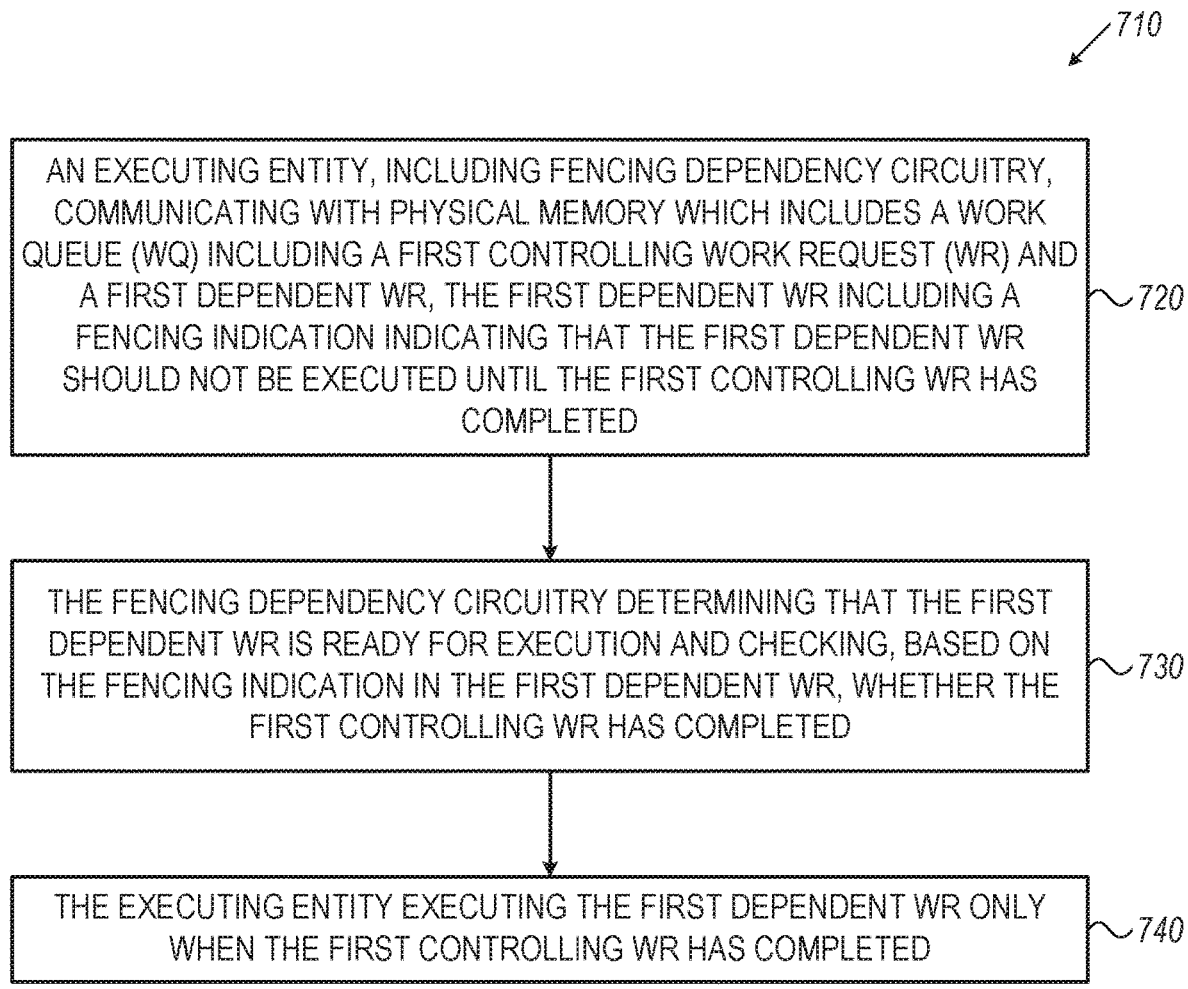
FIG. 7 is a simplified flowchart illustration of an exemplary method of operation of exemplary embodiments of the present invention.

Reference is now made to FIG. 7, which is a simplified flowchart illustration of an exemplary method of operation of exemplary embodiments of the present invention. While the exemplary method depicted in FIG. 7 is particularly applicable to the exemplary embodiment of FIG. 6 (and will be best understood with reference thereto), persons skilled in the art will appreciate that changes can be made to the exemplary method of FIG. 7 so that the method would apply, mutatis mutandis, to the exemplary embodiment of FIG. 5.

The method of FIG. 7, generally referred to by reference numeral 710, is depicted as comprising the following steps (it being appreciated that certain steps might be omitted, combined, or altered in certain exemplary embodiments):

An executing entity, including fencing dependency circuitry, communicates with physical memory (such as, by way of non-limiting example, via the bus 522 of FIG. 5 or via the bus 622 of FIG. 6). The physical memory includes a work queue (WQ). The WQ includes a first controlling work request (WR) and a first dependent WR. The first dependent WR includes a fencing indication indicating that the first dependent WR should not be executed until the first controlling WR has completed (step 720). In certain exemplary embodiments: there may be other WRs, including other controlling WRs and other dependent WRs; and the physical memory (typically memory associated with a host CPU) is external to the executing entity and external to a device in which the executing entity is comprised.

The fencing dependency circuitry determines that the first dependent WR is ready for execution and checks, based on the fencing indication in the first dependent WR, whether the first controlling WR has completed (step 730).

The executing entity executes the first dependent WR only when the first controlling WR has completed (step 740).

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. Apparatus comprising:
a hardware networking device, which pops work requests (WRs) of a producer from a single work queue (WQ) in a physical memory, external to the hardware networking device, and pushes completion queue entries (CQE) on to a completion queue (CQ) in the physical memory to notify the producer that handling a corresponding WR was completed, wherein the hardware networking device includes:
an executing entity which executes for popped WRs, respective communication tasks prescribed by the WRs;
wherein the WQ comprises a plurality of work requests (WRs) having an order, in accordance with the position of each WR of the plurality of WRs in the WQ, the plurality of work requests including both:
a first controlling work request (WR); and
a first dependent WR, the first dependent WR including a fencing indication indicating that the first dependent WR should not be executed until the first controlling WR has completed; and
fencing dependency circuitry in communication with the executing entity and to determine that the first dependent WR is ready for execution and to check, based on the fencing indication in the first dependent WR, whether the first controlling WR has completed,
wherein the executing entity is to execute the first dependent WR only when the first controlling WR has completed,
the executing entity does not execute any WR which is comprised in the plurality of WRs and which is after the first dependent WR in accordance with the order, until the executing entity has completed executing the first dependent WR,
wherein the fencing dependency circuitry is to determine whether the first controlling WR has completed by checking whether the CQ includes an entry indicating that the first controlling WR has completed.

2. Apparatus according to claim 1, and wherein the fencing dependency circuitry is comprised in the executing entity.

3. Apparatus according to claim 1 and wherein the physical memory is comprised in a physical computing device external to the executing entity, the physical computing device also comprising a processor, the processor being operative to access the WQ.

4. Apparatus according to claim 1 and wherein the fencing indication in the first dependent WR includes an identifier of the first controlling WR, and the fencing dependency circuitry is to check whether the first controlling WR has completed based on the identifier of the first controlling WR.

5. Apparatus according to claim 1 and wherein the WQ also comprises:

a second controlling WR; and a second dependent WR, the second dependent WR including a fencing indication indicating that the second dependent WR should not be executed until the second controlling WR has completed, and the fencing dependency circuitry is to determine that the second dependent WR is ready for execution and to check, based on the fencing indication in the second dependent WR, whether the second controlling WR has completed; and the executing entity is to execute the second dependent WR only when the second controlling WR has completed.

6. Apparatus according to claim 5 and wherein the fencing indication in the second dependent WR includes an identifier of the second controlling WR, and the fencing dependency circuitry checking whether the second controlling WR has completed comprises the fencing dependency circuitry determining whether the second controlling WR has completed based on the identifier of the second controlling WR.

7. Apparatus according to claim 6, wherein the executing entity determining whether the second controlling WR has completed based on the identifier of the second controlling WR comprises the executing entity checking whether the CQ includes an entry indicating that the second controlling WR has completed.

8. Apparatus according to claim 1 and wherein the WQ comprises a plurality of WRs, the plurality of WRs including: the first dependent WR; the first controlling WR; and at least one other WR, each WR of the plurality of WRs having a position in the WQ and an identifier corresponding to said position, and each WR of the plurality of WRs is completed in order, in accordance with the position of each WR of the plurality of WRs in the WQ and with said identifier, and the fencing dependency circuit is to check whether the first controlling WR has completed based on the identifier of the first controlling WR and on an identifier of a most recently completed WR.

9. The method of claim 1, wherein the fencing circuitry determines whether the first controlling WR has completed by comparing a dependency field of the first dependent WR with an identifier of a completed work request in the CQ.

* * * * *